(No Model.)
H. SEEMAN.
WAGON GEARING.
No. 325,869. Patented Sept. 8, 1885.
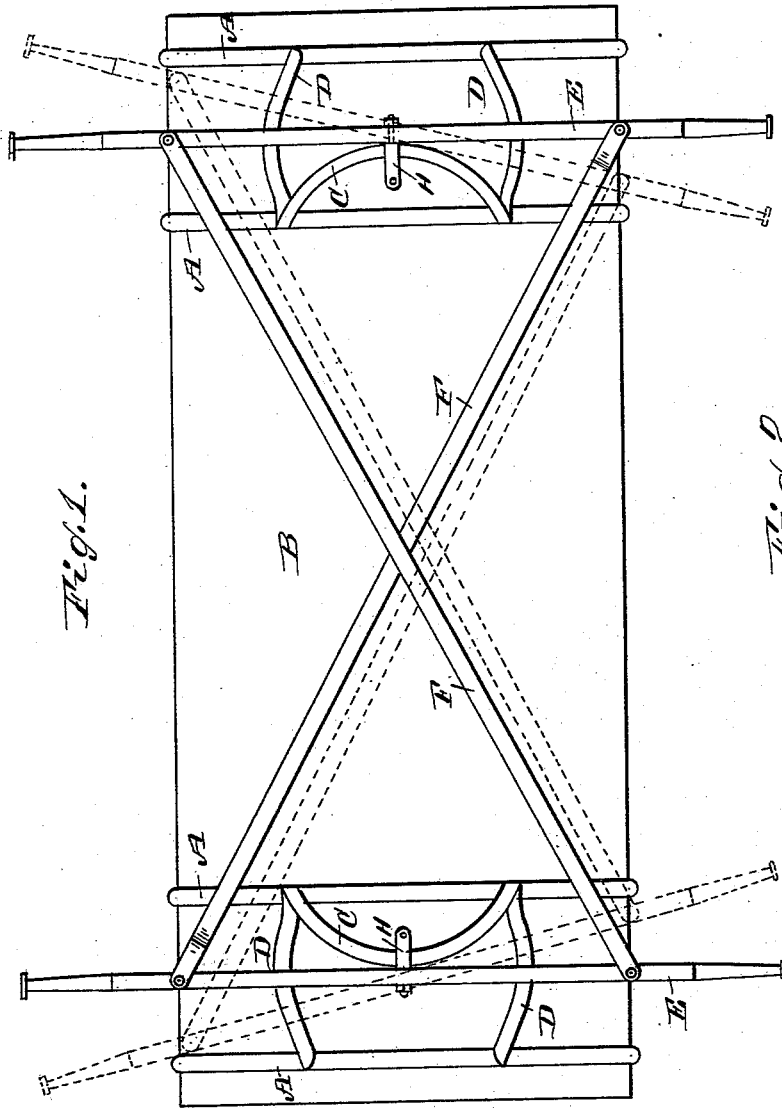
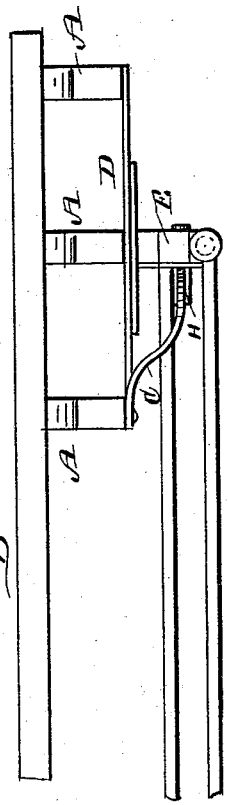
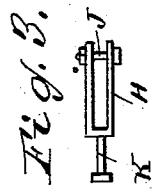
WITNESSES:
INVENTOR:
H. Seeman
BY Munn & Co.
ATTORNEYS.

UNITED STATES PATENT OFFICE.

HENRY SEEMAN, OF DURHAM, NORTH CAROLINA.

WAGON-GEARING.

SPECIFICATION forming part of Letters Patent No. 325,869, dated September 8, 1885.

Application filed July 11, 1885. (No model.)

*To all whom it may concern:*

Be it known that I, HENRY SEEMAN, of Durham, in the county of Durham and State of North Carolina, have invented a new and Improved Wagon-Gearing, of which the following is a full, clear, and exact description.

The object of my invention is to provide a new and improved wagon-gearing which is so constructed that no king-bolts are required, and the wagon can be turned very short.

The invention consists in the combination, with a wagon box or frame, of a segmental guide held on the under side of same at each end, axles held against the outer edges of said guides by clips, and of curved braces or bars uniting the axles.

Reference is to be had to the accompanying drawings, forming part of this specification, in which similar letters of reference indicate corresponding parts in all the figures.

Figure 1 is a plan view of the under side of a wagon provided with my improved gear. Fig. 2 is an enlarged detail view of a part of the same. Fig. 3 is a side view of the clip.

A A A are bolsters secured transversely on the under side of the box B at each end.

On the bolsters, at the front and rear, the segmental guide-plates C are held, their concave edges facing toward the center of the box, and on all three bolsters, at each end of the box, a pair of guides, D, are secured at the sides of the segmental guide C. The guides C are bent down so that their centers are lower than their ends and at about half the thickness of the axles E E, which axles are united by loosely-crossed diagonal braces or bars F, provided at the ends with forked clips, which are pivoted to the axles near their ends. The axles E are not held on any part of the vehicle box or frame by king-bolts, but are mounted to slide on the outer convex edges of the guides C.

The guides C pass between U-shaped clips H, having their free ends united by bolts J, and from the closed ends of the clips a bolt, K, projects through the center of the axles, whereby the said clips hold the axles on the convex edges of the guides C and guide the axles on the said guides. When a wagon having king-bolt gearing on both axles turns, the ends of the axles swing toward each other on one side of the wagon and from each other on the other side, but their centers remain relatively in the same positions; whereas in my improved gearing the axle ends move toward each other on one side and from each other on the other side, but at the same time the centers of the axles move toward each other as they slide on the convex edges of their guides C toward the same side of the wagon, and must thus approach more or less.

I am thus enabled to make a shorter turn or curve with a vehicle having my improved gear than with a vehicle having the ordinary gear.

Having thus described my invention, I claim as new and desire to secure by Letters Patent—

1. In wagon-gearing, the combination, with the box or frame B, of the segmental guides C, the axles E, the clips H for holding the axles to the guides C, and the crossed bars F, uniting the axles, substantially as herein shown and described.

2. In a wagon-gearing, the combination, with the box or frame B, of the segmental guides C, the axles E, the clips H for holding the axles to the guides C, the guides D at the sides of the guides C, and the crossed bars or braces F, uniting the axles, substantially as herein shown and described.

HENRY SEEMAN.

Witnesses:
J. P. ALBRIGHT,
WM. H. ROWLAND.